United States Patent
Gao et al.

(10) Patent No.: US 12,485,381 B2
(45) Date of Patent: Dec. 2, 2025

(54) PROCESS FOR ONBOARD CARBON CAPTURE USING $CO_2$ STRIPPING AND HEAT RECOVERY

(71) Applicant: SAUDI ARABIAN OIL COMPANY, Dhahran (SA)

(72) Inventors: Tianyu Gao, Beaverton, OR (US); Alexander Voice, Detroit, MI (US); Esam Z. Hamad, Brighton, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 422 days.

(21) Appl. No.: 18/066,059

(22) Filed: Dec. 14, 2022

(65) Prior Publication Data
US 2024/0198279 A1    Jun. 20, 2024

(51) Int. Cl.
*B01D 53/14*    (2006.01)
*B01D 53/18*    (2006.01)
(Continued)

(52) U.S. Cl.
CPC ..... *B01D 53/1475* (2013.01); *B01D 53/1418* (2013.01); *B01D 53/185* (2013.01);
(Continued)

(58) Field of Classification Search
CPC ............ B01D 53/1475; B01D 53/1418; B01D 53/185; B01D 53/92; B01D 2257/504;
(Continued)

(56) References Cited

U.S. PATENT DOCUMENTS 1,783,901 A * 12/1930 Bottoms ............ B01D 53/1493
423/242.7
8,080,089 B1* 12/2011 Wen .................... B01D 53/1475
95/174
(Continued)

FOREIGN PATENT DOCUMENTS

CN    114015475 A   *   2/2022  .............. F04B 37/12
CN    114788992 A   *   7/2022  ........... B01D 53/343
(Continued)

OTHER PUBLICATIONS

Epo translation of KR-20240122218-A (Year: 2024).*
(Continued)

*Primary Examiner* — Stephen Hobson
(74) *Attorney, Agent, or Firm* — Osha Bergman Watanabe & Burton LLP (57) ABSTRACT

Described is a system for capturing and recovering carbon dioxide ($CO_2$) from multiple distinct waste heat sources. The system includes an absorber for extracting $CO_2$ from exhaust gas into a solvent stream selective for absorbing $CO_2$ and creating a rich solvent stream. A solvent regenerator converts a first fraction of the rich solvent stream into a lean solvent stream and a crude $CO_2$ vapor. A cross exchanger exchanges heat between lean and rich solvent streams. Several heat exchangers are associated with the solvent regenerator to transfer heat from multiple distinct waste heat sources into a second fraction of the rich solvent stream as well as recover waste heat from the multiple distinct waste heat sources. A compressor converts the crude $CO_2$ vapor into a concentrated pressurized $CO_2$ product, and a $CO_2$ storage tank receives and stores the $CO_2$ product.

16 Claims, 3 Drawing Sheets

(51) Int. Cl.
*B01D 53/92* (2006.01)
*F01N 3/08* (2006.01)

(52) U.S. Cl.
CPC ........... *B01D 53/92* (2013.01); *F01N 3/0857* (2013.01); *F01N 3/0885* (2013.01); *B01D 2257/504* (2013.01); *B01D 2259/4566* (2013.01); *F01N 2260/04* (2013.01); *F01N 2570/10* (2013.01); *Y02T 10/00* (2013.01)

(58) Field of Classification Search
CPC ...... B01D 2259/4566; B01D 2252/204; B01D 2258/01; B01D 2258/012; B01D 53/1425; F01N 3/0857; F01N 3/0885; F01N 2260/04; F01N 2570/10; Y02T 10/00; F23J 15/04; F23J 2215/50
See application file for complete search history.

(56) References Cited

U.S. PATENT DOCUMENTS

| | | | | |
|---|---|---|---|---|
| 8,280,646 | B2* | 10/2012 | Seidel | G06Q 50/06 73/23.31 |
| 2002/0007733 | A1* | 1/2002 | Morrow | B01D 53/1487 95/237 |
| 2004/0144251 | A1* | 7/2004 | Mitsuda | B01D 53/62 96/108 |
| 2010/0132554 | A1* | 6/2010 | Huang | B01D 53/343 95/227 |
| 2013/0174739 | A1* | 7/2013 | Dvininov | F01N 3/0857 96/146 |
| 2013/0195742 | A1* | 8/2013 | Hamad | B01J 20/04 423/230 |
| 2013/0259781 | A1* | 10/2013 | Vitse | F23J 15/02 423/220 |
| 2016/0059180 | A1* | 3/2016 | Hamad | F01N 3/0857 423/212 |
| 2018/0216532 | A1* | 8/2018 | Smith | F02C 7/10 |
| 2020/0353404 | A1* | 11/2020 | Wong | C01B 32/50 |
| 2021/0356129 | A1* | 11/2021 | Tanaka | F01N 3/0842 |
| 2021/0404360 | A1* | 12/2021 | Al-Taher | B01D 53/1481 |
| 2022/0249974 | A1* | 8/2022 | Van Der Walt | B01D 53/261 |
| 2022/0274050 | A1* | 9/2022 | Carlier | B01D 53/62 |
| 2023/0130504 | A1* | 4/2023 | Voice | B01D 53/1418 60/274 |
| 2023/0191313 | A1* | 6/2023 | Heichelbech | F28D 21/001 95/183 |
| 2024/0058746 | A1* | 2/2024 | Heichelbech | B01D 53/1425 |
| 2025/0186936 | A1* | 6/2025 | Heichelbech | B01D 53/1425 |
| 2025/0250500 | A1* | 8/2025 | Sciamanna | B01D 53/047 |

FOREIGN PATENT DOCUMENTS

| | | | | |
|---|---|---|---|---|
| CN | 116139655 | A * | 5/2023 | ......... B01D 53/1475 |
| CN | 118320576 | A * | 7/2024 | ............. F25B 41/40 |
| CN | 118846752 | A * | 10/2024 | ......... B01D 53/1431 |
| CN | 118855590 | A * | 10/2024 | ............. F01D 15/10 |
| EP | 1594592 | A1 | 11/2005 | |
| EP | 2665808 | B1 | 12/2016 | |
| EP | 2673071 | B1 | 8/2017 | |
| EP | 2908928 | B1 | 5/2018 | |
| FR | 3152866 | A1 * | 3/2025 | ............... F25J 3/067 |
| KR | 102410191 | B1 | 6/2022 | |
| KR | 20240120443 | A * | 8/2024 | ............. B01D 19/00 |
| KR | 20240122218 | A * | 8/2024 | ................ B63J 2/12 |
| WO | WO-2004073838 | A1 * | 9/2004 | ............. B01D 53/62 |
| WO | 2016205057 | A1 | 12/2016 | |

OTHER PUBLICATIONS

Juho Piispa "Techno-economic analysis and Aspen Plus process simulation of a Power-to-Gas system integrated to waste incinerator" Thesis; Aalto University, School of Engineering; 2021 (83 pages).

R. Edvardsson et al. "Process Integration and Techno-Economic Assessment of CO2 Capture Processes Based on Phase-Change Solvents; Scientific Study on a State-of-the-Art Natural Gas Fired Power Plant" Department of Space, Earth and Environment, Chalmers University of Technology; Gothenburg, Sweden; 2019 (72 pages).

International Search Report issued for corresponding international patent application No. PCT/US2023/083585, mailed Jun. 6, 2024 (5 pages).

Written Opinion issued for corresponding international patent application No. PCT/US2023/083585, mailed Jun. 6, 2024 (8 pages).

* cited by examiner

PROCESS FOR ONBOARD CARBON CAPTURE USING $CO_2$ STRIPPING AND HEAT RECOVERY

BACKGROUND

Carbon dioxide ($CO_2$) emissions come from both natural and human sources. Natural sources of $CO_2$ include decomposition, ocean release, and respiration. Human sources of $CO_2$ come from activities such as deforestation and burning of fossil fuels, including coal, oil, and natural gas. Vehicles and other mobile machinery contribute to climate change and pollution; therefore, zero emission engines are an area of active research. Zero emission engines do not release greenhouse gases, such as $CO_2$, methane, and nitrous oxide, to the atmosphere.

$CO_2$ emissions from mobile sources, including vehicles and ships, need to be significantly reduced to achieve the goal of zero emission. Conventional absorption-stripping processes have been proposed for onboard $CO_2$ capture because of high technology matureness and efficiency. Absorption is used to separate gas mixtures, remove impurities, or recover valuable chemicals. Stripping is the operation of removing the absorbed solute from the solvent, which includes transferring components from a liquid to a vapor stream. Absorbers are normally used with strippers to permit regeneration, or recovery, and recycling of the absorbent. Absorption-stripping processes are energy intensive and require heat input.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for capturing and recovering carbon dioxide ($CO_2$) from two or more heat sources. The system comprises an absorber for extracting $CO_2$ from exhaust gas into a solvent stream selective for absorbing $CO_2$ and creating a rich solvent stream. The system further comprises a solvent regenerator for converting a first fraction of the rich solvent stream into a lean solvent stream and a crude $CO_2$ vapor. A cross exchanger of the system exchanges heat between lean and rich solvent streams. Several heat exchangers are associated with the solvent regenerator to transfer heat from two or more heat sources into a second fraction of the rich solvent stream as well as recover waste heat from the multiple heat sources. A compressor of the system converts the crude $CO_2$ vapor into a concentrated pressurized $CO_2$ product, and a $CO_2$ storage tank of the system receives and stores the $CO_2$ product.

In another aspect, the system is mounted on a mobile vehicle or vessel.

In yet another aspect, the two or more distinct waste heat sources comprise at least two of an engine exhaust going to a tailpipe of an internal combustion engine; an engine exhaust being recirculated to the internal combustion engine; a boiler exhaust; and an engine coolant.

In another aspect, embodiments disclosed herein relate to a process for capturing and recovering $CO_2$ from two or more distinct waste heat sources using a system for capturing and recovering $CO_2$ mounted on a mobile vehicle or vessel. A lean solvent stream comprising a solvent selective for absorbing $CO_2$ is introduced into the system. The system is operated such that $CO_2$ is absorbed into a lean solvent stream using an absorber, forming a rich solvent stream. In addition, the system is operated such that heat is transferred from the lean solvent stream into a rich solvent stream using a cross exchanger. Then, a first fraction of the rich solvent stream is converted into the lean solvent stream and a crude $CO_2$ vapor using a solvent regenerator. Next, heat is transferred from two or more distinct waste heat sources into a second fraction of the rich solvent stream using two or more heat exchangers associated with the solvent regenerator. The system is operated such that the crude $CO_2$ vapor is converted into a concentrated pressurized $CO_2$ product using a compressor. Finally, the concentrated pressurized $CO_2$ product is received and stored in a $CO_2$ storage tank.

In another aspect, the concentrated pressurized $CO_2$ product is passed from the mobile vehicle or vessel.

In another aspect, a temperature, a flow rate, or a pressure of the rich solvent stream or the lean solvent stream is controlled by a control system.

Other aspects and advantages of the claimed subject matter will be apparent from the following description and the appended claims.

DETAILED DESCRIPTION

For the purpose of this description, a single reference number will be assigned to a line as well as a stream carried in that line. Similar reference numbers refer to similar components. The person skilled in the art will readily understand that while the design is illustrated referring to one or more specific combinations of features and measures many of those features and measures are functionally independent from other features and measures. Such features and measures may be equally or similarly applied independently in other embodiments or combinations.

Described is a system and method for capturing and storing carbon dioxide ($CO_2$) from multiple distinct waste sources from existing fuel and powertrain infrastructures, such as $CO_2$ transport ships or vehicles. Multiple opportunities exist for extracting high-quality waste heat for use in solvent regeneration. Non-limiting examples of waste streams include hot exhaust leaving an aftertreatment system and going to the tailpipe of an internal combustion engine of a vehicle, hot exhaust gas being recirculated to an internal combustion engine (i.e., exhaust gas recirculation (EGR)), high temperature coolant from an internal combustion engine, and boiler exhaust.

The system and method according to embodiments of this disclosure implements a flexible heat integration strategy using multiple distinct waste heat sources to desorb $CO_2$ and regenerate the solvent. Additionally, a temperature-pressure control strategy may be implemented with the use of two or more heat exchangers. In some embodiments, flashing may be permitted in the heat exchangers to reduce the solvent temperature and mitigate solvent degradation. Further, a cross exchanger may be utilized to reduce the solvent residence time in the hot zone and mitigate solvent degradation. Many existing systems use a reboiler in which there is a low circulation velocity, causing a long residence time for solvent degradation. The configuration of the cross exchanger according to one or more embodiments of the present disclosure may allow for a higher circulation velocity, resulting in a short residence time for solvent degradation.

Finally, a sequence of heat exchangers may be optimized to match the exhaust temperature of the waste heat sources and maximize the efficiency of waste heat utilization. For instance, depending on the temperature of the waste heat, an upstream exchanger in the system may use a lower temperature waste heat, and the downstream exchanger may use a higher temperature waste heat. The design of the heat recovery process described herein improves energy efficiency, mitigates solvent degradation, and reduces equipment requirements and process volume compared to current systems in the literature. Each of these aspects will be described in detail below.

Figure 1:
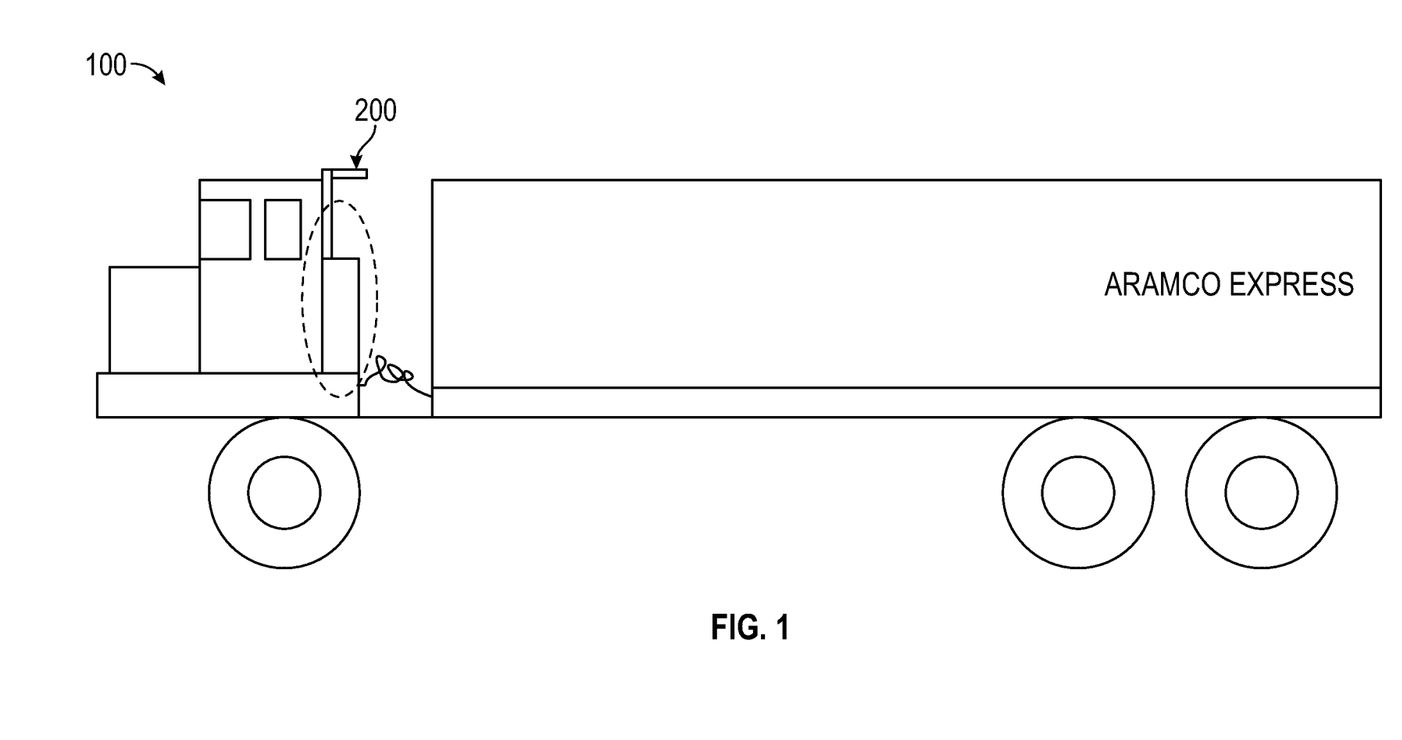
FIG. 1 illustrates a mobile vehicle with a mounted carbon dioxide ($CO_2$) capture and recovery system according to embodiments of the present disclosure.

FIG. 1 is an example of a system according to embodiments herein as part of a mobile, self-propelled vehicle. FIG. 1 shows a mobile vehicle with a permanently mounted heat recovery and $CO_2$ capture system. A semi-truck (100) is a type of mobile, self-propelled vehicle that emits $CO_2$ through an exhaust stream that may be treated by embodiment exhaust gas $CO_2$ capture and recovery systems described herein. Examples of such mobile vehicles or vessels include, but are not limited to, cars, trucks, ships, and airplanes. In FIG. 1, the semi-truck (100) is shown with an embodiment system (200) mounted to the rear portion of the semi-truck (100). The semi-truck (100) is representative of a type of mobile, self-propelled vehicle, in this case being a class 8 truck towing a semi-trailer. While described herein with respect to use with mobile on-road sources, embodiments herein may also be useful for capturing $CO_2$ from off-road sources as well as stationary sources, such as generators. These machines all emit $CO_2$, have relatively high-quality waste heat that can be used for solvent regeneration, and may produce rotating shaft work that can be used. For example, generator sets, locomotives, and agricultural and construction equipment that may be powered by internal combustion engines may also benefit from embodiments herein.

Mobile vehicles with an exhaust gas $CO_2$ capture and recovery system as described herein are not limited to vehicles or vessels that are self-propelled. Embodiment exhaust gas $CO_2$ capture and recovery systems herein may also be mounted on mobile yet non-self-propelled vehicles and vessels, such as a towed barge, a land- or water-borne skiff, or a land- or water-borne drilling platform or "rig". The mobile unit is configured to be moved and to supply an exhaust stream to the embodiment exhaust gas $CO_2$ capture and heat recovery system for concentrated pressurized $CO_2$ recovery.

Figure 2:
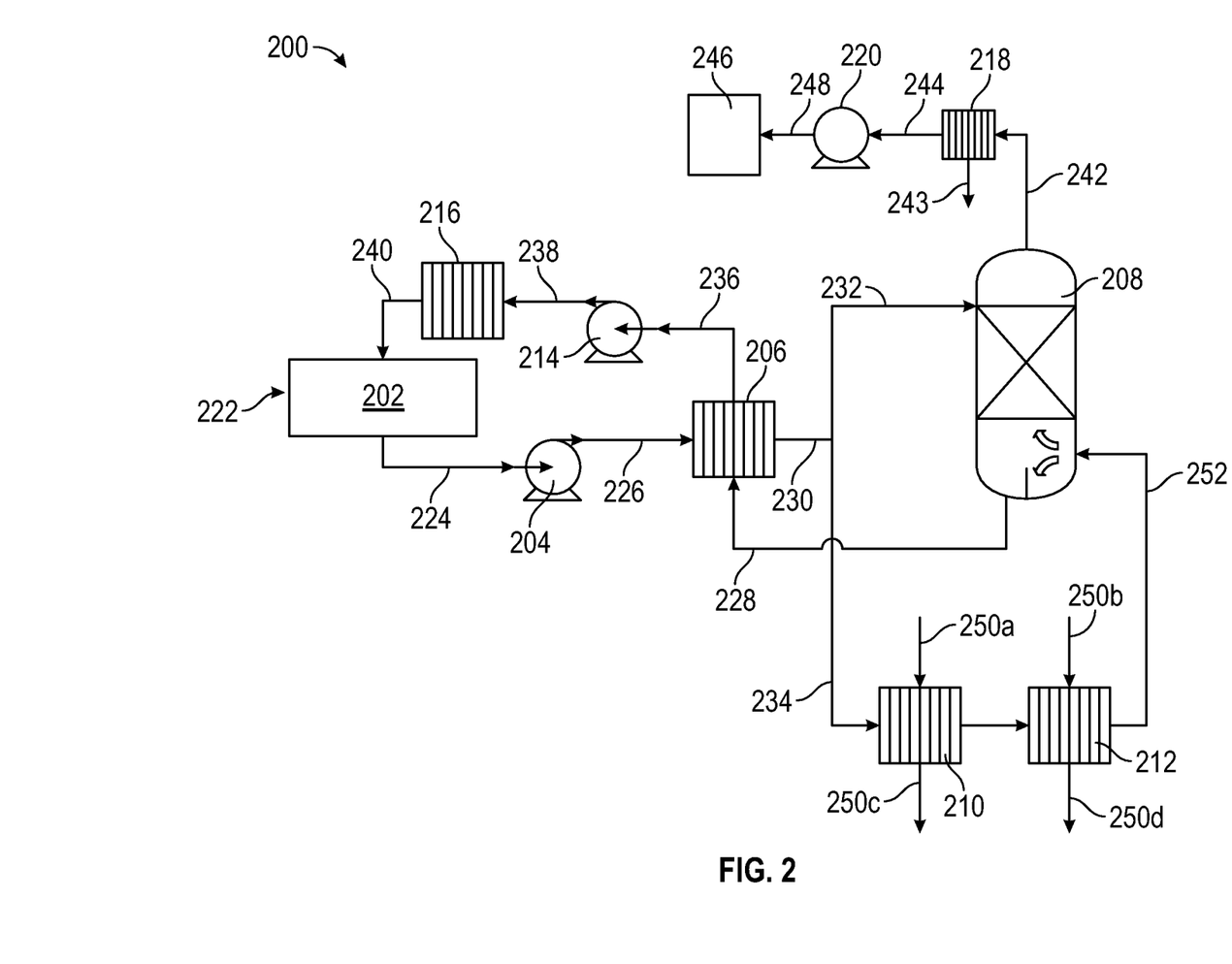
FIG. 2 illustrates a flow diagram of a $CO_2$ capture and recovery system according to embodiments of the present disclosure.

FIG. 2 is a flow diagram illustrating an embodiment of the heat recovery and $CO_2$ capture system (200) including an absorber (202), a pump (204) and a pump (214), a liquid-liquid cross exchanger (206), a solvent regenerator (208), a first waste heat source recovery heat exchangers (210) and a second waste heat source recovery heat exchangers (212), an air trim cooler (216), a stripper vapor condenser (218), and a $CO_2$ compressor (220). As can be appreciated by one skilled in the art, the components of the system (200) may include inlets, outlets, and flow paths may connect the outlets and inlets of the components.

In the heat recovery and $CO_2$ capture process according to embodiments of this disclosure, a fresh solvent (222) containing low levels of $CO_2$ may enter the absorber (202) to recharge the system (200). Solvents useful for the system (200) include aqueous solutions of water-soluble amines, amino acids, alkaline salts, and combinations thereof. Non-limiting examples of useful water-soluble amines include, but are not limited to, monoethanolamine (MEA), diethanolamine (DEA), methyl diethanolamine, piperazine and derivatives (for example, 1-methyl-piperazine, 2-methyl-piperazine, N-aminoethyl-piperazine), morpholine, 2-amino-2-methyl-propanol, diisopropanolamine, ethylenediamine, hexamethylenediamine, and combinations thereof. Other water-soluble amines may be primary, secondary, or tertiary amines, and combinations thereof. For example, the system solvent may include MEA in a range of from about 5 to about 10 molar concentration (M) in water.

In some instances, the system solvent is alkaline in pH, for example, being a pH in a range of from about 8 to about 12. In some instances, the system solvent is configured such that the solvent is operable to absorb $CO_2$ at about 40° C., such as 20° C. to 60° C. in some embodiments, and to desorb the $CO_2$ at a temperature equal to or greater than about 90° C., such as 80° C. to 200° C. in some embodiments, or such as 95° C. to 120° C. in other embodiments.

When passed through the absorber (202), the lean solvent (240) absorbs $CO_2$ from a $CO_2$ emission source to produce a $CO_2$ rich solvent (224). In one or more embodiments, the $CO_2$ rich solvent (224) has a rich $CO_2$ loading of approximately 0.38, such as from 0.3 to 0.5. As used herein, lean solvent refers to a solvent having a diminished $CO_2$ content, suitable for absorbing $CO_2$ from an exhaust gas, such as tail pipe exhaust or EGR exhaust. A rich solvent refers to a solvent having an enhanced $CO_2$ content following absorption of the $CO_2$ from the exhaust gas.

In one embodiment, the pump (204) draws cold rich solvent (224) from the absorber (202) at a temperature in the range of 43° C., such as 20° C. to 60° C. in some embodiments, and a mass flow rate of about 60 kilograms/minute (kg/min), such as 40 kg/min to 80 kg/min in some embodiments. The pressurized cold rich solvent discharged from the pump (204) may have a pressure of approximately 8 bar, such as from 4 bar to 15 bar in some embodiments, such that the rich solvent (224) may be heated and then superheated using a series of heat exchangers before being introduced into the solvent regenerator. In one or more embodiments, a pressurized rich solvent (226) is heated by a hot lean solvent (228) exiting the solvent regenerator (208) through the liquid-liquid cross exchanger (206). The liquid-liquid cross exchanger (206) is effective in transferring a significant amount of energy from the lean solvent (228) into the pressurized rich solvent (226). The pump (204) may be used to elevate the pressure of the rich solvent to a pressure sufficient to maintain the rich system solvent as a liquid, avoiding vaporization of any water or $CO_2$, until distribution into the solvent regenerator.

The heated rich solvent (230) leaving the liquid-liquid cross exchanger (206) is split into a first fraction of the rich solvent stream (232) and a second fraction of the rich solvent stream (234). The heated rich solvent (230) may be split via a three-way valve or multiple valves along a line. The first fraction of the rich solvent stream (232) provides stripper liquid flow, while the second fraction of the rich solvent stream (234) provides vapor flow. The liquid downflow is required for countercurrent gas and liquid contact. Liquid feeds to the top, flows downward, and transfers $CO_2$ with the vapor stream.

In one or more embodiments, the rich solvent stream (234) may be split into two fractions such that approximately 40% to 60% of the rich solvent (230) becomes the first fraction of the rich solvent stream (232) and approximately 40% to 60% becomes the second fraction of the rich solvent stream (234). The first fraction of the rich solvent stream (232) enters an upper portion of the solvent regenerator (208), or stripper. The first fraction of the rich solvent stream (232) flows downward against a countercurrent flow of vapor generated in a lower portion of the solvent regenerator (208). A lean solvent (228) stream may be recovered from the bottom of the solvent regenerator (208). The lean solvent (228) may provide heat to the rich solvent (226) through the liquid-liquid cross exchanger (206), as described above.

In one or more embodiments, the liquid-liquid cross exchanger (206) reduces the temperature of the resulting lean solvent stream (236) to approximately 50° C., such as from 20° C. to 70° C. in some embodiments. The lean solvent stream (236) is pumped to a higher pressure via the pump (214). In some embodiments, the pump is a centrifugal pump capable of pumping between 3 barg and 6 barg. The high-pressure stream (238) exiting the pump (214) is passed through the air trim cooler (216) to achieve a desired temperature before returning to the absorber (202). For example, the air trim cooler (216) may reduce the temperature of the solvent (240) leaving the air trim cooler (216) to approximately 40° C. to improve $CO_2$ absorption in the absorber (202).

In some embodiments, the solvent regenerator (208) may be configured to maximize surface area contact to facilitate regeneration of the lean solvent and recovery of $CO_2$ gas. In one or more embodiments, the solvent regenerator (208) is a stripper column containing random, or structured, packing material configured to facilitate mass transfer between gas and liquid phases. In some embodiments, the solvent regenerator (208) may be configured similar to a traditional distillation column, such as with side-to-side alternating distillation trays, where rich solvent flows downwards and released $CO_2$ gas flows upwards. Another configuration may be one where the column has random or structured packing, or sections of both, where the rich solvent flows downwards, converts into lean solvent, and released $CO_2$ gas flows upwards, each taking a tortuous path in their respective directions. Another configuration is where a series of spray nozzles mist or atomize the rich solvent. Other variations and configurations are understood by one of skill in the distillation arts and are envisioned as applicable to this disclosed subject matter. Regardless of the configuration, in the lower portion of the solvent regenerator (208) there is an amount of lean solvent and proximate to the upper portion of the solvent regenerator (208), there is a high concentration of $CO_2$ gas saturated with water.

The second fraction of the rich solvent stream (234) is provided to the first waste heat source recovery heat exchanger (210) followed by the second waste heat source recovery heat exchanger (212) to recover waste heat streams (250a), (250b), (250c), and (250d) from two or more heat sources. Non-limiting examples of heat sources include hot engine exhaust, engine EGR, and hot engine coolant. For instance, the waste heat stream (250a) may be a tail pipe exhaust feed stream, while waste heat stream (250b) may be provided by an operating engine. While two waste heat source recovery heat exchangers (210) and (212) are depicted in FIG. 2, the system (200) is not limited to any particular number of waste heat source recovery heat exchangers. The waste heat source recovery heat exchangers (210) and (212) recover heat from the waste heat streams (250a), (250b), (250c), and (250d) and provide the rich solvent (252) leaving the waste heat source recovery heat exchangers (210) and (212) to the solvent regenerator (208). The solvent regenerator (208) may be configured to receive the first fraction of the rich solvent stream (232) in its upper portion and to receive solvent (252) from the two or more waste heat source recovery heat exchangers (210) and (212) in its lower portion. The first fraction of the rich solvent stream (232) may flow through a spray nozzle to create additional mass transfer, as described in detail below.

The system (200) includes a $CO_2$ product pathway. The $CO_2$ product pathway provides for receiving crude $CO_2$ vapor (242) from the solvent regenerator (208) and producing a concentrated pressurized $CO_2$. Along the pathway, the crude $CO_2$ is concentrated and purified by removing water from the $CO_2$ vapor (242). The crude $CO_2$ vapor (242) passes into the stripper vapor condenser (218). The stripper vapor condenser (218) is coupled to, and downstream of, the solvent regenerator (208). The stripper vapor condenser (218) may be an air-based cooler that extracts heat into the atmosphere such that the temperature of the crude $CO_2$ vapor (242) is reduced.

After cooling the saturated vapor, some of the water in the crude $CO_2$ vapor (242) condenses into a liquid and exits via a liquid effluent flow line (243). The vapor product is a trimmed $CO_2$ (244) that passes from the stripper vapor condenser (218) into the $CO_2$ compressor (220). The compressed pressurized CO2 product (248) passes from the $CO_2$ compressor (220) into an on-board $CO_2$ storage tank (246). The on-board $CO_2$ storage tank (246) may be transported to an injection site for permanent underground storage.

In some embodiments, the $CO_2$ compressor (220) may be coupled to the mobile vehicle or vessel to receive power. For example, the $CO_2$ compressor (220) may be coupled via a direct mechanical coupling, such as via a gear box to a turbo shaft. Direct mechanical coupling may also be provided via a gear box to a main engine shaft. Alternatively, hydraulic power may be provided via motor drive by hydraulic fluid pressurized by the engine shaft, or electric power may be provided via motor connected to a battery or alternator. The efficiencies and ease of integration vary for each of the possible embodiments, and may be selected based on available spacing, costs, efficiency desired, and other factors.

In some embodiments, the on-board $CO_2$ storage tank (246) may be permanently mounted to the mobile vehicle or vessel and connected to the system (200). In some other embodiments, the on-board $CO_2$ storage tank (246) may be detachable from the mobile vehicle or vessel and the system (200). In yet some other embodiments, a combination of permanent and detachable tanks may be used. The construction of the on-board $CO_2$ storage tank (246) may favor lighter-weight materials to reduce the overall weight of the system. Such materials may include alloys of steel, aluminum, or titanium; polymers; and composite materials, such as fiber glass and carbon fiber.

The concentrated pressurized $CO_2$ product (248) may be off-loaded during a period where the system (200) is not operating. As well, it is envisioned that the concentrated pressurized $CO_2$ product (248) may be off-loaded while the system (200) is operating. For example, by using more than one tank, it is feasible that $CO_2$ may be off-loaded while fresh, concentrated pressurized $CO_2$ is recovered. For example, a detachable on-board $CO_2$ storage tank (246) may be used to off-load a portion or all of the concentrated pressurized $CO_2$ product (248) that is stored in a permanently mounted tank. As well, a first permanent or detachable tank may be used to recover concentrated pressurized $CO_2$ product (248) as the system operates (e.g., an engine is operating and producing exhaust) while a second permanent or detachable tank is being off-loaded of concentrated pressurized $CO_2$ product (248). It is envisioned that a person of ordinary skill in the art may also develop a procedure for safely and effectively off-loading a permanently mounted on-board $CO_2$ storage tank (246) while the system is producing a concentrated pressurized $CO_2$ product (248).

Figure 3:
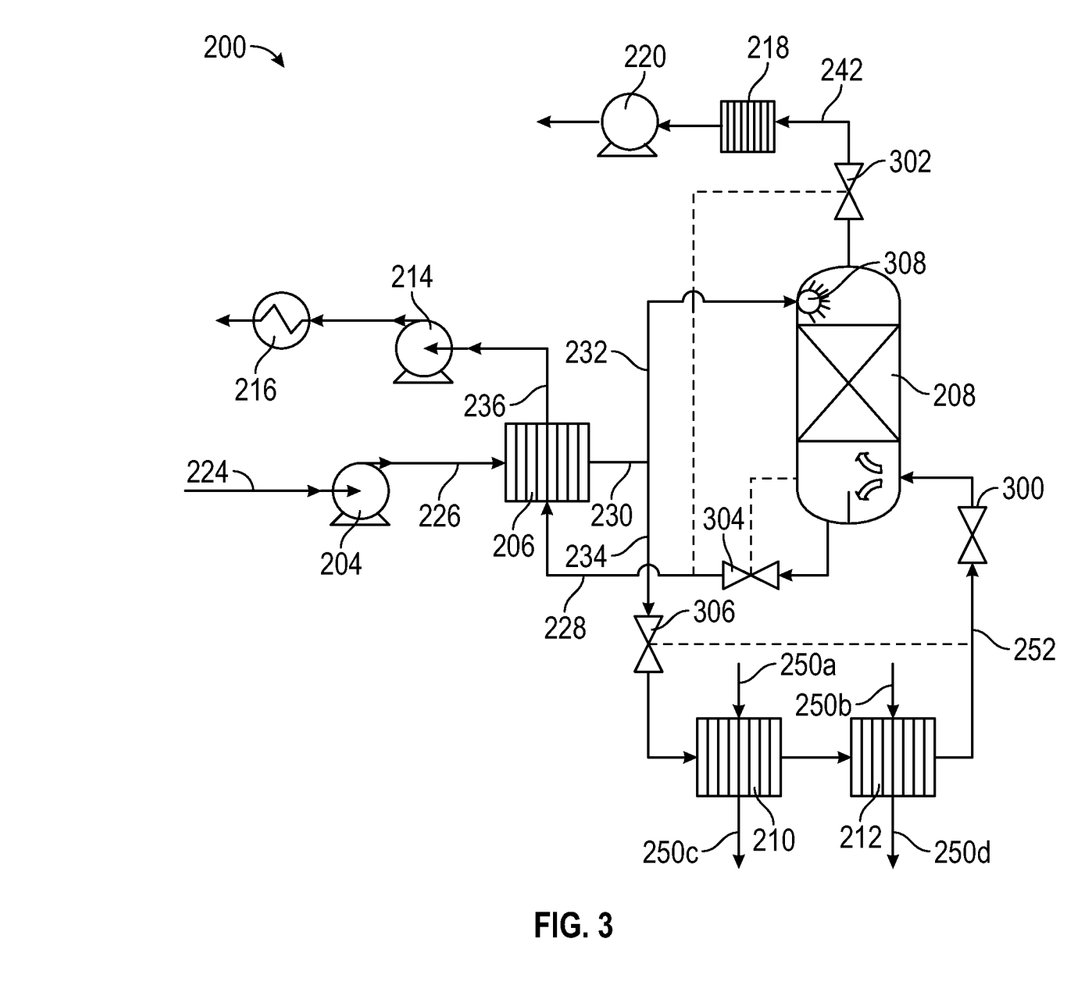
FIG. 3 illustrates a flow diagram of a $CO_2$ capture and recovery system having a control system according to embodiments of the present disclosure.

FIG. 3 illustrates solvent split fractioning in the heat recovery and $CO_2$ capture system using a control system according to one or more embodiments of the present disclosure. As shown in FIG. 3, the system (200) includes multiple control elements that act to control temperature, pressure, flow, and liquid levels in the system (200). Non-limiting examples of control elements include one or more of pressure control elements, flow control elements, temperature control elements, and liquid level control elements. A standard level controller may be used for the liquid level control. Additionally, the overall optimization may vary with different absorber configurations.

Performance of the solvent regenerator (208) (stripper) and heat integration performance were evaluated using simulator software, such as Aspen Plus. System performance in the example system (200) depicted in FIG. 3 was simulated under the following non-limiting assumptions and constraints. An approximately 7 molar (m) monoethanolamine (MEA) $CO_2$ rich solvent (i.e., rich solvent (224)), such as 5 m to 9 m in some embodiments, with a loading of about 0.38, such as from 0.2 to 0.5, a temperature of 43° C., such as 20° C. to 60° C. in some embodiments, and a flow rate of 60 kg/min, such as 40 kg/min to 80 kg/min in some embodiments, is pressurized to about 8 bar, such as 2 bar to 15 bar, using the pump (204).

The pressurized cold rich solvent (226) flows through the liquid-liquid cross exchanger (206), recovering the sensible heat from the hot lean solvent (228) leaving the solvent regenerator (208). In one or more embodiments, the liquid-liquid cross exchanger (206) is designed with a log mean temperature difference (LMTD) of approximately 7° C. The LMTD is a logarithmic average of the temperature difference between the hot and cold streams at each end of the exchanger. The LMTD may be used to determine a balance between the liquid-liquid cross exchanger capital cost and the system's energy performance. For instance, a large LMTD reduces the size and cost of the heat exchanger but leads to a larger heat duty since more sensible heat is lost. The hot lean solvent (228) enters the liquid-liquid cross exchanger (206) at approximately 120° C., such as 100° C. to 140° C. in some embodiments. The hot rich solvent (230) exiting the liquid-liquid cross exchanger (206) is approximately 113° C., such as 90° C. to 130° C. in some embodiments.

The hot $CO_2$ rich solvent (230) is split into two fractions of rich solvent streams (232) and (234) and fed to the solvent regenerator (208), as described above. The split fraction a variable that may be optimized in the system according to embodiments of the present disclosure. In the exemplary embodiment, the split is 50%. A set maximum temperature of the solvent regenerator (208) may be determined by solvent degradation. In some embodiments, the sump of the solvent regenerator (208) may be set to a maximum of 120° C. for the MEA solvent. As can be appreciated by one skilled in the art, the temperature limit may be higher for solvents with higher thermal stability, such as methyldiethanolamine (MDEA) (135° C.) and piperazine (PZ) (150° C.).

The second fraction of the rich solvent stream (234) may be allowed to flash in the waste heat source recovery heat exchangers (210) and (212) with a large pressure drop to enhance the heat transfer. For example, the pressure drop in the waste heat source recovery heat exchangers (210) and (212) may be approximately 1 bar, with an inlet pressure from about 6 barg to about 8 barg and an outlet pressure from about 4 barg to about 6 barg. The amount of flashing may be controlled by the inlet pressure. Solvent flashes and operating pressures of the waste heat source recovery heat exchangers (210) and (212) may be set to limit the maximum temperature below a set point temperature degradation limit (e.g., T<125° C.). The rich solvent (252) (flashing stream) may feed to a sump of the solvent regenerator (208) to provide vapor (242) for $CO_2$ stripping.

A pressure control valve (300) upstream of the solvent regenerator (208) may be used to regulate the pressure of the rich solvent (252) leaving the waste heat source recovery heat exchangers (210) and (212). Flashing is allowed in the waste heat source recovery heat exchangers (210) and (212) to reduce the solvent temperature and mitigate solvent degradation. In addition, the temperature of the rich solvent (252) leaving the waste heat recover exchangers may be the same or higher than the temperature of the sump of the solvent regenerator (208) by controlling the pressure. A higher temperature regeneration may reduce overall energy consumption.

In the exemplary embodiment, the first waste heat source recovery heat exchanger (210) provides approximately 49.6 kilowatts (kw) of heat, such as 35 kw to 65 kw in some embodiments, and the waste heat recovery exchanger (212) provides approximately 31.9 kw of heat, such as 25 kw to 45 kw in some embodiments. The rich solvent (252) leaving the waste heat recovery exchangers is heated to approximately 120° C., such as 100° C. to 140° C. in some embodiments. The rich solvent (252) may be heated to 5° C. to 10° C. higher than the temperature of the solvent regenerator (208) because of the short residence time in the hot zone. An additional pressure control valve (302) downstream of the solvent regenerator (208) may be used to regulate the pressure in the $CO_2$ vapor (242) leaving the solvent regenerator (208). In the exemplary embodiment of FIG. 3, the temperature of the $CO_2$ vapor (242) that has passed through the pressure control valve (302) is about 115° C., such as 95° C. to 125° C., and the $CO_2$ vapor (242) is cooled to around 40° C. and is pressurized to approximately 1 barg to 5 g barg, such as 2.2 barg, in some embodiments. Another pressure control valve (304) may be implemented to regulate the pressure in the hot lean solvent (228) leaving the solvent regenerator (208).

One or more flow control valves (306) may be implemented in the system (200). When the flow rate of the first fraction of the rich solvent stream (232) is less than, for example, 30% of the flow rate of the heated rich solvent (230), the first fraction of the rich solvent stream (232) provides less cooling to the upper portion of the solvent regenerator (208). In this scenario, the $CO_2$ vapor (242) leaving the solvent regenerator (208) contains more water, leading to a decrease in energy performance. Furthermore, when the flow rate of the second fraction of the rich solvent stream (234) is low, it may be "over-stripped". The second fraction of the rich solvent stream (234) may not be able to use all of the waste heat streams (250a), (250b), (250c), and (250d) because the solvent temperature may be too high due to the low flow rate through the waste heat source recovery heat exchangers (210) and 212). Therefore, one or more flow control valves (306) may assist in regulating the flow rate of the two fractions of the rich solvent streams (232) and (234).

In some embodiments, an inlet for the first fraction of the rich solvent stream (232) into the solvent regenerator (208) is configured with a high-pressure spray nozzle (308), such as an atomizing flow nozzle. The high-pressure spray nozzle (308) may be used to take advantage of the free high pressure and increase the mass transfer.

Supporting equipment for embodiments of the system may include additional standard components or equipment that enables and makes operable the described apparatuses, processes, methods, systems, and compositions of matter. Examples of such standard equipment known to one of ordinary skill in the art includes but are not limited to heat exchangers, pumps, blowers, reboilers, steam generators, condensate handlers, membranes, single and multi-stage compressors, separation and fractionation equipment, valves, switches, controllers and pressure-, temperature-, level- and flow-sensing devices.

TABLE 1

| Process Design Criteria | |
| --- | --- |
| Engine torque | 1244 Nm |
| Engine speed | 1333 RPM |
| Exhaust temperature | 260 C. |
| Exhaust flow rate (kg/min) | 14.6 |
| EGR temperature | 438 C. |
| EGR flow rate (kg/min) | 5.34 |
| Exhaust CO2 concentration (%) | 8.98 |
| Optimal process parameters | |
| Rich solvent circulation rate (kg/min) | 60 |
| Lean $CO_2$ loading | 0.31 |
| Rich $CO_2$ loading | 0.38 |
| Rich solvent split fraction | 0.5 |
| Regenerator sump temperature | 120 C. |
| Rich solution to exhaust outlet pressure | 7.2 bar |
| Rich solution to exhaust outlet temperature | 125 C. |
| Heat exchanged in solvent to EGR exchanger (212) | 31.9 |
| Heat exchanged in solvent to exhaust exchanger (206) | 49.6 |

Table 1 illustrates estimated conditions and results for achievable capture rates. Note that these numbers are for illustrative purposes only and may be higher or lower depending upon the design of various process equipment, operating conditions, and system efficiencies achieved. Operation, control, and performance of portions of or entire steps of a process or method can occur through human interaction, pre-programmed computer control and response systems, or combinations thereof. Some values are provided for an exemplary embodiment to illustrate the mass flow, temperature, and pressure relationships of the equipment and streams; depending upon the solvent mixture used, engine type, engine size, and other variables as noted above and recognizable to one skilled in the art, actual temperatures, pressures and flows for envisioned embodiments may vary. For example, a four-cylinder engine may have significantly smaller flows as compared to an eight-cylinder engine.

The configuration of the heat recovery and $CO_2$ capture system described herein improves energy efficiency, mitigates solvent degradation, and reduces the equipment requirement and process volume. Additionally, the system is applicable to a variety of systems having two or more distinct waste heat sources. The performance of the system may be further improved by optimizing the exchanger sequences and temperature gradient. In some embodiments, the upstream exchanger may use a lower temperature waste heat, and the downstream exchanger may use a higher temperature heat. For example, given two waste heat sources at 120° C. and 130° C., the lower temperature waste heat stream (e.g., 250a) may exchange heat first with the solvent, and the higher temperature waste heat stream (e.g., 250b) may follow.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system for capturing and recovering carbon dioxide (CO2) from two or more distinct waste heat sources, the system comprising:
    an absorber configured to extract at least a portion of CO2 from an exhaust gas into a lean solvent stream comprising a solvent selective for absorbing CO2 and to produce a rich solvent stream comprising solvent and absorbed CO2;
    a solvent regenerator configured to convert a first fraction of the rich solvent stream into the lean solvent stream and a crude CO2 vapor, wherein the solvent regenerator is coupled to the absorber such that the solvent regenerator is downstream of the absorber for receiving the first fraction of the rich solvent stream and upstream of the absorber for providing the lean solvent stream;
    a cross exchanger configured to exchange heat between the lean solvent stream being fed from the solvent regenerator to the absorber and the rich solvent stream being fed from the absorber to the solvent regenerator;
    two or more heat exchangers associated with the solvent regenerator and configured to transfer heat from the two or more distinct waste heat sources into a second fraction of the rich solvent stream and to recover waste heat from the two or more distinct waste heat sources;
    a compressor configured to convert the crude CO2 vapor into a concentrated pressurized CO2 product, wherein the compressor is downstream of the solvent regenerator; and a CO2 storage tank configured to both receive and store the concentrated pressurized CO2 product, wherein the CO2 storage tank is downstream of the compressor.

2. The system of claim 1, wherein the system is mounted on a mobile vehicle or vessel.

3. The system of claim 1, wherein the two or more distinct waste heat sources comprise at least two of an engine exhaust going to a tailpipe of an internal combustion engine; an engine exhaust being recirculated to the internal combustion engine; a boiler exhaust; and an engine coolant.

4. The system of claim 3, wherein a first of the two or more heat exchangers is configured to exchange heat between the solvent and the engine exhaust going to the tailpipe and a second of the two or more heat exchangers is configured to exchange heat between the solvent and the engine exhaust being recirculated.

5. The system of claim 3, wherein a first of the two or more heat exchangers is configured to exchange heat between the solvent and the engine exhaust going to the tailpipe and a second of the two or more heat exchangers is configured to exchange heat between the solvent and the engine coolant.

6. The system of claim 3, wherein a first of the two or more heat exchangers is configured to exchange heat between the solvent and the engine exhaust being recirculated and a second of the two or more heat exchangers is configured to exchange heat between the solvent and the engine coolant.

7. The system of claim 3, wherein a first of the two or more heat exchangers is configured to exchange heat between the solvent and the boiler exhaust and a second of the two or more heat exchangers is configured to exchange heat between the solvent and the engine exhaust going to the tailpipe.

8. The system of claim 3, wherein a first of the two or more heat exchangers is configured to exchange heat between the solvent and the boiler exhaust and a second of the two or more heat exchangers is configured to exchange heat between the solvent and the engine exhaust being recirculated.

9. The system of claim 1, further comprising a pump configured to pressurize the lean solvent stream being fed from the solvent regenerator to the absorber.

10. The system of claim 9, further comprising a trim cooler configured to reduce a temperature of the lean solvent stream being fed from the pump before the lean solvent stream returns to the absorber, wherein the trim cooler is downstream of the pump and upstream of the absorber.

11. The system of claim 1, further comprising a control system configured to maintain a temperature of the solvent below a set point temperature and a short residence time sufficient to limit solvent degradation.

12. The system of claim 1, further comprising a control system configured for one or more of: controlling a flow rate of the first fraction of the rich solvent stream, controlling a flow rate of the second fraction of the rich solvent stream, controlling a temperature or a pressure of the solvent regenerator; or, controlling a temperature or a pressure of the rich solvent stream or the lean solvent stream.

13. The system of claim 1, wherein the solvent regenerator comprises a stripper column containing packing material configured to facilitate mass transfer between gas and liquid phases, and wherein the stripper column is configured to receive the first fraction of the rich solvent stream in an upper portion of the stripper column and to receive solvent from the two or more heat exchangers in a lower portion of the stripper column.

14. A process for capturing and recovering carbon dioxide ($CO_2$) from two or more distinct waste heat sources using a system for capturing and recovering $CO_2$ mounted on a mobile vehicle or vessel, the process comprising:
introducing a lean solvent stream comprising a solvent selective for absorbing $CO_2$ into the system;
operating the system such that $CO_2$ is absorbed into the lean solvent stream using an absorber, forming a rich solvent stream;
operating the system such that heat is transferred from the lean solvent stream into the rich solvent stream using a cross exchanger;
operating the system such that a first fraction of the rich solvent stream is converted into the lean solvent stream and a crude $CO_2$ vapor using a solvent regenerator;
operating the system such that heat is transferred from the two or more distinct waste heat sources into a second fraction of the rich solvent stream using two or more heat exchangers associated with the solvent regenerator;
operating the system such that the crude $CO_2$ vapor is converted into a concentrated pressurized $CO_2$ product using a compressor; and
operating the system such that the concentrated pressurized $CO_2$ product is received and stored in a $CO_2$ storage tank.

15. The process of claim 14, further comprising passing the concentrated pressurized $CO_2$ product from the mobile vehicle or vessel.

16. The process of claim 14, further comprising operating the system such that a temperature, a flow rate, or a pressure of the rich solvent stream or the lean solvent stream is controlled by a control system.

* * * * *